Nov. 27, 1945.  N. Z. HEBERT  2,389,976
AGRICULTURAL DEVICE
Original Filed May 8, 1941
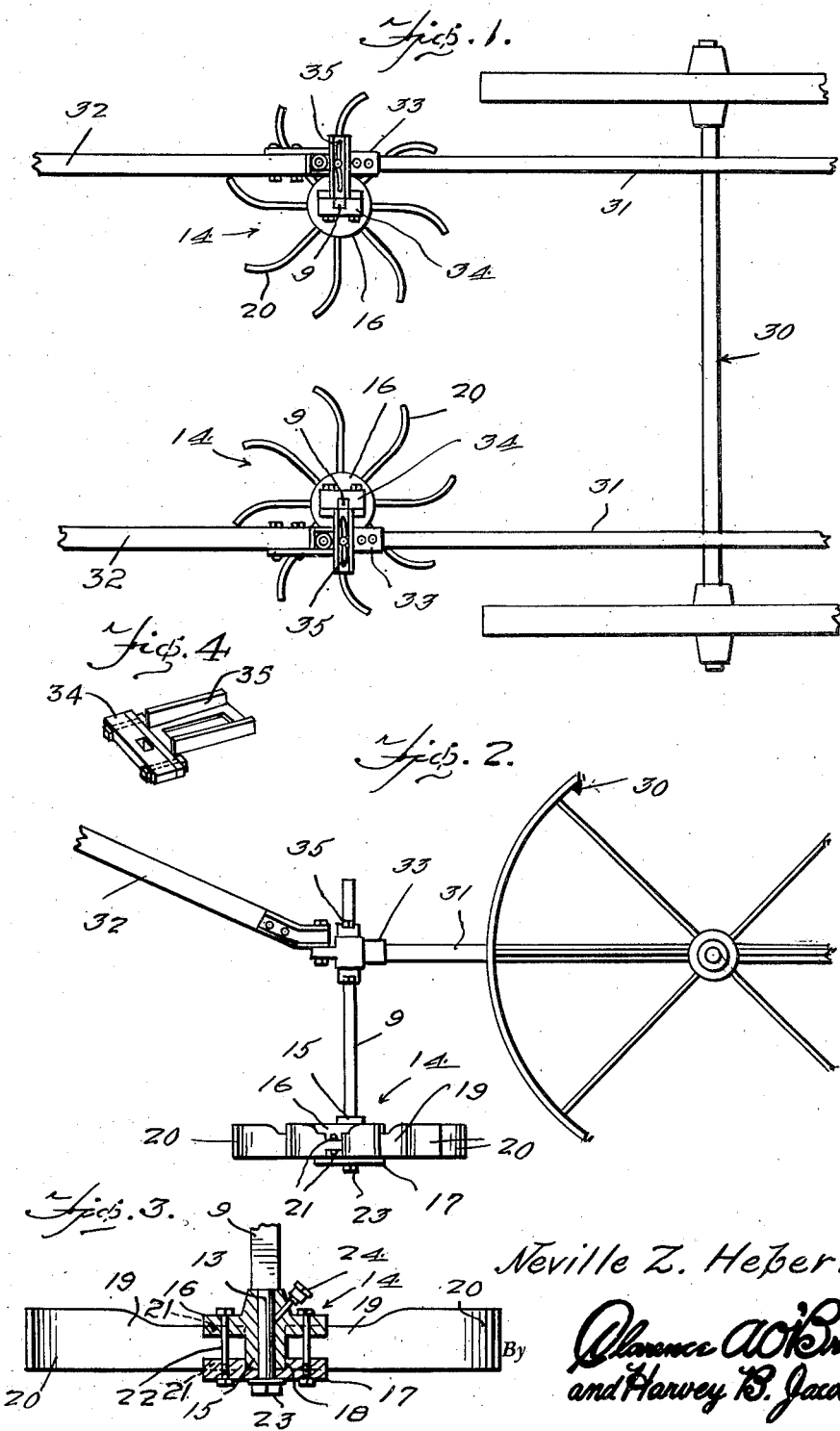
Inventor
Neville Z. Hebert
By Clarence A. O'Brien
and Harvey B. Jacobson
Attorneys Patented Nov. 27, 1945

2,389,976

UNITED STATES PATENT OFFICE 2,389,976

AGRICULTURAL DEVICE

Neville Z. Hebert, Jeanerette, La.

Original application May 8, 1941, Serial No. 392,553. Divided and this application September 16, 1944, Serial No. 554,476

1 Claim. (Cl. 97—60)

This invention relates to new and useful improvements in agricultural devices, and has more particular reference to a cultivator having a plurality of rotary hoes mounted thereon for operation in the rear of the earth-working elements of the cultivator.

The present application is a division of my copending application upon "Agricultural device," Serial No. 392,553, filed May 8, 1941.

An important object of the present invention is to provide an agricultural device of the above kind wherein the rotary hoes may be conveniently adjusted as desired to meet various conditions of use.

Another object of the invention is to provide an agricultural device of the above kind which is simple in construction, highly efficient in use, and otherwise well adapted to meet with the requirements for a successful commercial use.

The present invention consists in the novel form, combination and arrangement of parts hereinafter more fully described, shown in the accompanying drawing and claimed.

In the drawing, wherein like reference characters indicate corresponding parts throughout the several views:

Figure 1 is a fragmentary top plan view showing rotary hoes installed on a walking cultivator in accordance with the present invention.

Figure 2 is a side elevational view of the construction shown in Figure 1.

Figure 3 is a view in vertical section through one of the rotary hoes.

Figure 4 is a perspective view of a clamp constituting an element of the machine.

Referring in detail to the drawing, reference numeral 30 designates generally a portion of a walking cultivator comprising side longitudinal frame bars 31 having handles 32 secured to their rear ends by couplings 33. Clamps 34 are provided on the inner sides of the couplings 33 for adjustably securing the shanks 9 of rotary hoes 14 thereto. The shanks 9 are vertically adjustable through the clamps 34, and clamps 34 are adjustable laterally of the couplings 33. Thus, the rotary hoes may be adjusted at the required elevation with respect to the surface of the ground and may also be adjusted toward or away from each other for proper positioning at opposite sides of the row being cultivated. The mounting of clamps 34 for lateral adjustment is generally indicated at 35 and is slotted longitudinally to permit adjustment.

As is clearly shown in my above-mentioned co-pending application, the shanks 9 terminate at their lower ends in reduced spindles 13 on which the rotary hoes 14 are mounted. The hoes 14 include hubs 15 which are journaled on the spindles 13. Formed integrally with the hubs 15 are flanges 16, and mounted on the lower end portions of the hubs 15 are metallic discs 17 having sockets 18 therein for the reception of said hubs. Blades 19 are mounted between the flanges 16 and the discs 17, the inner ends of said blades abutting the hubs 15. The blades 19 radiate from the hub assembly and terminate in curved outer end portions 20. The opposed faces of the flanges 16 and the discs 17 have formed therein radial grooves or channels 21 which receive the inner end portions of the blades 19. These blades are firmly clamped between the flanges 16 and the discs 17 through the medium of bolts 22, and nuts 23 are threaded on the lower end portions of the spindles 13 for securing the hub assemblies thereon. Suitable fittings 24 are provided on the hubs 15 for lubricating the spindles 13.

In operation, the cultivator is moved over the ground while straddling the row. As the row is cultivated, the rotary hoes 14 travel adjacent opposite sides of the row and the blades 19 thereof are caused to enter the row from the opposite sides of the latter. Contact by the blades 19 with the ground as the machine travels forwardly causes the hoes 14 to rotate in opposite directions. In this way, an efficient hoeing action is had at opposite sides of the row being cultivated.

From the foregoing description, it is believed that the construction and operation, as well as the advantages, of the present invention will be readily understood and appreciated by those skilled in the art.

What I claim is:

An agricultural device comprising a frame including side bars, handles, couplings connecting front ends of said handles with rear ends of said side bars, clamps disposed in transverse spaced relation to said couplings and each having an arm extending transversely therefrom across the companion coupling transversely thereof, fasteners passing through said couplings and the arms of the clamps and mounting the clamps for adjustment transversely of the couplings to set positions, shanks disposed vertically through said clamps and shiftable vertically to adjusted positions, and rotary hoes rotatably mounted at lower ends of said shanks.

NEVILLE Z. HEBERT.